United States Patent [19]

Parish et al.

[11] Patent Number: 5,373,036
[45] Date of Patent: Dec. 13, 1994

[54] SPRAYABLE FILLER COMPOSITION

[75] Inventors: David M. Parish, Loveland; Kenneth E. Lewis, Lebanon, both of Ohio;

[73] Assignee: Fibre Glass-Evercoat Company, Inc., Cincinnati, Ohio

[21] Appl. No.: 182,575

[22] Filed: Jan. 18, 1994

Related U.S. Application Data

[62] Division of Ser. No. 67,707, May 26, 1993.

[51] Int. Cl.[5] .................. C09D 5/34; C08K 3/36; C08K 3/32; C08L 35/06
[52] U.S. Cl. .................. 523/219; 523/515; 525/445
[58] Field of Search .............. 523/219, 515; 525/445

[56] References Cited

U.S. PATENT DOCUMENTS

| | | | |
|---|---|---|---|
| 3,873,475 | 3/1975 | Pechacek | 523/219 |
| 4,053,448 | 10/1977 | Holle | 523/219 |
| 4,590,101 | 5/1986 | Knapczyk | 427/350 |
| 4,695,618 | 9/1987 | Mowrer . | |
| 4,716,210 | 12/1987 | Trümmelmeyer et al. . | |
| 4,906,677 | 3/1990 | Barsotti et al. . | |
| 4,916,173 | 4/1990 | Otloski | 523/219 |
| 4,967,956 | 11/1990 | Mansfield . | |
| 5,057,555 | 10/1991 | White et al. . | |
| 5,171,613 | 12/1992 | Bok et al. . | |

Primary Examiner—Melvyn I. Marquis
Assistant Examiner—D. R. Wilson
Attorney, Agent, or Firm—Killworth, Gottman, Hagan & Schaeff

[57] ABSTRACT

A sprayable, high solids, low-volatiles filler composition is provided which may be used as a coating on a variety of substrates. The sprayable filler composition comprises a first filler/glazing component formed from a mixture of a resin, a filler, a mixture of thixotropic clays, activated fumed silica, hollow glass microspheres, and a ketone solvent. The sprayable filler composition has a second catalyst component. The glazing/filler component is blended with the catalyst component, preferably either internally or externally of the spray nozzle, and the resultant sprayable filler composition is sprayed onto a substrate. The resulting cured coating provides a sandable surface which is corrosion resistant.

5 Claims, No Drawings

SPRAYABLE FILLER COMPOSITION

This is a divisional application of U.S. patent application Ser. No. 08/067,707 filed May 26, 1993 pending.

BACKGROUND OF THE INVENTION

The present invention relates to a sprayable filler composition, and more particularly, to a high solids, low-volatiles sprayable filler composition which may be used as a coating on a variety of substrates, and which provides a corrosion resistant, sandable surface.

Multi-component spraying systems are widely used in the plastics and marine industries. In such systems, a liquid resin and a catalyst for the resin are mixed together and sprayed onto a substrate such that the catalyst and resin react and harden on the substrate. The mixing may be done immediately before spraying (referred to as an internal mix system) or immediately after spraying (referred to as an external mix system). In either event, such coatings are referred to as a "gel coat". For example, U.S. Pat. No. 4,967,956 to Mansfield discloses a "gel coat" spraying system which uses a resin such as an epoxy resin or a polyester resin, a catalyst for the resin, and spraying means which includes an airless liquid nozzle. Such gel coats utilize a slow curing process, and the coatings do not provide a sandable surface.

Another disadvantage of such gel coatings is that application of the coatings is effected through the use of organic solvents to reduce viscosity. Because of increased environmental concerns about volatile organic components (VOC's), efforts have been made to reduce the amount of volatile materials used in such coating operations. As a result, the use of high solids coatings has been employed to meet VOC regulations. For example, White et al, U.S. Pat. No. 5,057,555, discloses a coating composition having a high solids content which is used as a finish for automobiles and trucks comprising an acrylic polymer and a catalyst. However, the coating cures very slowly. In addition, the composition still includes from 20-60% of an organic solvent. Further, such high solids coatings often run and sag when applied to vertical surfaces, and they have poor shelf and pot life.

As an alternative to using organic solvents, Bok et al, U.S. Pat. No. 5,171,613, teaches using a supercritical fluid as a non-polluting diluent in combination with a coating mixture. However, the method of spraying the coating requires the use of a heated spray gun to maintain the temperature of the coating mixture.

Accordingly, there is still a need in the art for a sprayable coating composition which may be easily applied to a variety of substrates, cures quickly, provides a sandable surface, and contains low volatiles.

SUMMARY OF THE INVENTION

The present invention meets that need by providing a sprayable, high solids, filler composition containing low volatiles. The composition has a VOC content of 74.5 g./l., which meets all current regulations. The high solids content of the composition retains other desirable qualities such as unlimited pot life. The sprayable filler composition of the present invention is a two-part one having a first filler/glazing component and a second catalyst component. When the two components are mixed and sprayed (or sprayed and mixed) the resultant coating cures quickly and provides a corrosion resistant, sandable surface. Accordingly, it may be used on a variety of substrates such as on metal heavy duty vehicle bodies, on concrete as a facing, and on metal-based bathroom fixtures such as sinks and comodes. Generally, it may be coated on iron, aluminum, wood, fiberglass, concrete and other materials.

According to one aspect of the present invention, a sprayable, high solids, low-volatiles filler composition for use as a coating on substrates is provided having a first filler/glazing component comprising a resin, a filler, a mixture of thixotropic clays, activated fumed silica, hollow glass microspheres, and a small amount of ketone solvent.

Preferably, the resin is selected from the group consisting of unsaturated polyesters (i.e. linear polyester resins based on dibasic acids and dihydric alcohols capable of cross-linking with vinyl monomers to form thermoset copolymers), vinyl esters, epoxy resins, acrylic and polyester polyols, and mixtures thereof. In one embodiment of the invention, the resin is selected from the group consisting of unsaturated polyesters, vinyl esters, and mixtures thereof, and the catalyst component is selected from the group consisting of methyl ethyl ketone peroxide and benzoyl peroxide.

In an alternative embodiment of the invention, the resin comprises an epoxy resin or mixtures of epoxy resins and the catalyst component is selected from the group consisting of polyamine, mercaptan, and boron trifluoride. In yet another embodiment of the invention, the resin comprises acrylic or polyester polyols and the catalyst component is selected from the group consisting of isobiurate and isocyanurate.

Preferably, the filler is selected from the group consisting of calcium carbonate, talc, and combinations thereof. The preferred ketone solvent is acetone.

The sprayable filler composition also preferably includes a styrene monomer to aid in curing, as well as an accelerator selected from the group consisting of dimethyl aniline, cobalt naphthenate, cobalt neodecanate, or mixtures thereof. The sprayable filler composition also preferably includes a coloring agent selected from the group of titanium dioxide, black oxide, or mixtures thereof.

The catalyst component may be blended with the filler/glazing component to form the sprayable filler composition which may then be sprayed on the substrate. In an alternative embodiment, the catalyst component is maintained as a separate component which is mixed with the filler/glazing component during the spraying process, either internally or externally of the spray nozzle. Preferred is an external mix dual-component spray system for mixing since it eliminates pot life limits.

In a preferred form, the filler/glazing component of the sprayable filler composition of the present invention comprises: from about 20% to about 50% by weight of a resin selected from the group consisting of unsaturated polyesters, vinyl esters, a mixture of epoxy resins, acrylic and polyester polyols, or mixtures thereof; from about 5% to about 25% by weight of a filler; from about 1% to about 15% by weight of a mixture of thixotropic clays; from about 0.2% to about 2% by weight activated fumed silica; from about 1% to 15% by weight hollow glass microspheres; and from about 0% to 20% by weight of a ketone solvent.

The sprayable filler composition also preferably includes 0 to 12% of a styrene monomer, 0.2 to 2.0% of an accelerator selected from the group consisting of dimethyl aniline, cobalt naphthenate, cobalt neodecanate, or mixtures thereof, and from 0.2 to 4.0% of a coloring agent selected from the group consisting of titanium dioxide, black oxide, or mixtures thereof.

The second catalyst component is from about 1 to 50% of a catalyst selected from the group consisting of methyl ethyl ketone peroxide, benzoyl peroxide, boron trifluoride, polyamine, mercaptan, isobiurate, and isocyanurate.

In a more preferred embodiment, the sprayable filler composition comprises from about 35% to about 45% by weight of a resin selected from the group consisting of unsaturated polyesters, and vinyl esters, or mixtures thereof, 6 to 10% of a styrene monomer, 2 to 4% of a coloring agent selected from titanium dioxide, black oxide, or mixtures thereof, 0.8 to 2% of an accelerator selected from the group consisting of dimethyl aniline, cobalt naphthenate, cobalt neodecanate, or mixtures thereof; from about 10% to about 20% by weight of a filler; from about 1% to about 10% by weight of a mixture of thixotropic clays; from about 0.5% to about 1% by weight fumed silica; from about 2% to 10% by weight hollow glass microspheres; and from about 0% to 10% by weight of a ketone solvent.

The second catalyst component of the sprayable filler composition further includes 2 to 4% of a catalyst component and preferably about 3% by weight of the filler/glazing component of a methyl ethyl ketone peroxide catalyst.

The present invention also provides a method of using the sprayable filler composition which includes the steps of: a) forming a first filler/glazing component in the form of a mixture of a resin selected from the group consisting of unsaturated polyesters, vinyl esters, epoxy resins, acrylic and polyester polyols, and mixtures thereof; a filler, a mixture of thixotropic clays; activated fumed silica; hollow glass microspheres, and a ketone solvent; b) adding a second catalyst component to the mixture to initiate the cure of the sprayable filler composition; and c) spraying the sprayable filler composition through a spray nozzle onto a substrate. As mentioned, the catalyst is preferably added to the filler/glazing component during the spraying step.

The sprayable filler composition and method of the present invention provides high deposition of the coating on a substrate (either primed or unprimed) and results in a surface which is sandable, corrosion resistant, primable and paintable. In addition, because the composition cures quickly, the overall finishing costs are reduced. Other advantages of the sprayable filler composition of the present invention are its low volatiles content, and other environmentally sound features (i.e., no out gassing, no recognized carcinogenic components, no ozone depleting substances), its extended pot life due to its dual component nature, the ability to form relatively thick (15-25 mils) single layer wet coats, and the ability to form even thicker overall coatings by applying multiple layers, its ability to fill major pits, grind marks, casting flaws and even large surface imperfections permitting use on rough-finish, less costly substrates, and its self-leveling ability.

Accordingly, it is an object of the present invention to provide a sprayable, high solids, low-volatiles filler composition for use as a coating on substrates, which cures quickly, and provides a sandable surface which is corrosion resistant. These and other objects and advantages of the invention will become apparent from the following detailed description and the appended claims.

DETAILED DESCRIPTION OF THE PREFERRED EMBODIMENT

The sprayable filler composition of the present invention provides many advantages over previous coatings in that it cures quickly, provides a sandable surface, contains low volatiles, and is less expensive to produce. The composition may be applied to a variety of substrates including metals such as iron, aluminum, concrete, wood, fiberglass and polyester fillers, etc.

The present sprayable filler composition preferably comprises a first filler/glazing component including a resin selected from the group consisting of unsaturated polyesters and vinyl esters. Such resins provide fast curing and good adhesion. Suitable unsaturated polyesters are available from Reichhold Chemicals, Inc. of Research Triangle Park, Durham, N.C. under the Polylite trademark and the designation 32-374, which is a mixture of a maximum of 67% of a proprietary polyester resin and 38% of a styrene monomer (CAS #100-42-5), and which has a boiling point of 295° F., a volatile percentage of 33–38%, a vapor density heavier than air, and a specific gravity of 1.10. Suitable vinyl esters include 8084 vinyl ester, which is a mixture of 40–50% of a styrene monomer (CAS #000100-42-5) and the balance vinyl ester resin (CAS #068492-68-2), and which has a boiling point of 294° F., a vapor pressure of 7 mmHg at 20° C., a vapor density of 3.6 based on styrene, and a specific gravity of 1.010–1,035, and 411-35 vinyl ester, which is a mixture of 35–50% of a styrene monomer (CAS #000100-42-5) and the balance vinyl ester resin (CAS #036425-16-8), and which has a boiling point of 294° F., a vapor pressure of 7mmHg at 20° C., a vapor density of 3.6 based on styrene and a specific gravity of 1,025–1,075, both available from Dow Chemical Company of Midland, Mich. under the Derakane trademark. Other suitable resins for use in the present invention include epoxy resins, specifically Bisphenol-A type resins available from Reichhold Chemicals, Inc. under the Epotuf trademark and the designation 37-140, which is 100% of a Bisphenol-A diglycidyl ether (CAS #25085-99-88) and which is non-volatile and has a specific gravity of 1.16.

A styrene monomer is preferably included in the filler/glazing component to increase the rate of polymerization and to reduce the viscosity of the composition. However, it should be noted that in instances where vinyl esters are used as resins, an encapsulated petroleum based wax should be used in place of some of the styrene. Suitable waxes include BYK S-740 available from Byk Chemie.

The thixotropic clays suitable for use in the filler/glazing component of the present invention include prewet and dry organo clays. A suitable prewet clay is available from Rheox, Inc. under the trade name MPA-60-x. A preferred dry clay is quaternary ammonium bentonite, available from United Catalysts, Inc. under the trade name Advitrol 6-8. The prewet clay acts as an antisettling agent and also provides thixotropic properties to the composition while the dry clay provides fast shear viscosity, and also provides thixotropic properties.

Fumed silica is included in the filler/glazing component to provide fast viscosity, and also acts as a thixotropic agent. The fumed silica is commercially available from DeGussa Company under the trade name Aerosil 200. The fumed silica is preferably activated by the addition of ethylene glycol.

The preferred fillers for the filler/glazing component of the present invention include talc and calcium carbonate. These fillers provide thixotropic properties to the composition and also aid in providing sanding properties to the coated substrate. A preferred talc is MP25-38 available from Pfizer. Calcium carbonate is commercially available from Genstar under the trade name Camel Wite.

Preferably, the filler/glazing component includes a coloring agent to form a colored finish. Suitable coloring agents include black iron oxide, available from Pfizer, and titanium dioxide (Rutile), available from SCM Chemicals under the designation Tiona RCL-9.

The filler/glazing component also preferably includes accelerating agents to speed up the curing time. Suitable accelerators include dimethyl aniline, available from Dupont under the designation N,N DMA, and cobalt naphthenate or cobalt neodecanate, available from Mooney Chemical, Inc. under the designation TEN-CEM.

The preferred ketone solvent for the filler/glazing component is acetone, which evaporates quickly, and also reduces the viscosity of the sprayable filler composition.

The hollow glass spheres used in the filler/glazing component of the present invention provide an excellent sanding surface, reduce the weight and cost of the filler composition, aid in thixotropy, and provide a tooth which assists in the application of subsequent coatings. Preferred for use are hollow glass spheres available from 3M Company under the trade name E-22-X Bubbles.

Based on the foregoing, the preferred filler/glazing component of the sprayable filler composition comprises: from about 20% to about 50% by weight of a resin selected from the group consisting of unsaturated polyesters, vinyl esters, a mixture of epoxy resins, acrylic and polyester polyols, or mixtures thereof; from about 5% to about 25% by weight of a filler; from about 1% to about 15% by weight of a mixture of thixotropic clays; from about 0.2% to about 2% by weight activated fumed silica; from about 1% to 15% by weight hollow glass microspheres; and from about 0% to 20% by weight of a ketone solvent. The filler/glazing component also includes from 0 to 12% of a styrene monomer, 0.2 to 2% of an accelerator selected from the group consisting of dimethyl aniline, cobalt naphthenate, cobalt neodecanate, or mixtures thereof, and from 0.2 to 4% of a coloring agent selected from the group consisting of titanium dioxide, black oxide, or mixtures thereof.

The sprayable filler composition further includes as the catalyst component from 1 to 50% of a catalyst selected from the group consisting of methyl ethyl ketone peroxide, benzoyl peroxide, boron trifluoride, polyamine, mercaptan, isobiurane, and isocyanurate.

More preferably, the sprayable filler composition filler glazing/component comprises: from about 35% to about 45% by weight of a resin selected from the group consisting of unsaturated polyesters and vinyl esters, or mixtures thereof, 6 10% of a styrene monomer, 2 to 4% of a coloring agent selected from titanium dioxide, black oxide, or mixtures thereof, 0.8 to 2% of an accelerator selected from the group consisting of dimethyl aniline, cobalt naphthenate, cobalt neodecanate, or mixtures thereof; from about 10% to about 20% by weight of a filler; from about 1% to about 10% by weight of a mixture of thixotromic clays; from about 0.5% to about 1% by weight fumed silica; from about 2% to 10% by weight hollow glass microspheres; and from about 0% to 10% by weight of a ketone solvent.

The sprayable filler composition further includes from 2 to 4% of a catalyst component.

The present invention also provides a method by which the sprayable filler composition is used. The present method preferably comprises the steps of: a) forming a filler/glazing component of the sprayable filler composition from a mixture of a resin selected from the group consisting of unsaturated polyesters, vinyl esters, epoxy resins, acrylic and polyester polyols, and mixtures thereof; a filler, a mixture of thixotropic clays; activated fumed silica; hollow glass microspheres, and a ketone solvent; b) adding a catalyst component to the filler/glazing component to form the sprayable filler composition, and c) spraying the sprayable filler composition through a spray nozzle onto a substrate. In one embodiment, the catalyst component is added to the filler/glazing component during the spraying step. The catalyst component may be mixed with the filler/glazing component during the spraying process, either internally or externally of the spray nozzle. For example, the catalyst component can be sprayed with the filler/glazing component and blended externally using a dual spray gun such as the PRED/FRP equipment from Binks of Franklin Park, Ill.

Once the catalyst component is mixed with the filler/glazing component and the sprayable filler composition sprayed onto a substrate the composition gels in about 1.5–2.5 minutes and is tack free in 8–10 minutes at 73° F. The cured composition provides a sandable surface which is resistant to corrosion. In addition, the resulting finish does not require sanding or a sealer prior to the application of top coats. Accordingly, the filler composition may be used for a variety of applications including leveling uneven surfaces such as pits, grind marks, casting flaws, and large surface imperfections.

In order that the invention may be more readily understood, reference is made to the following example, which is intended to be illustrative of the invention, but is not intended to be limiting in scope.

EXAMPLE 1

The filler/glazing component of a sprayable filler composition was prepared in accordance with the present invention. The relative proportions of each component is shown in Table I below.

TABLE I

| Compound Description | % by weight |
|---|---|
| unsaturated polyester[1] | 38.3 |
| unsaturated polyester[2] | 7.3 |
| styrene monomer | 3.9 |
| organic thixotropic clay[3] | 4.1 |
| black iron oxide | 0.02 |
| quaternary ammonium bentonite[4] | 0.44 |
| titanium dioxide rutile[5] | 2.45 |
| micro talc[6] | 14.68 |
| calcium carbonate[7] | 9.79 |
| fumed silica[8] | 0.73 |
| 12% cobalt neodecanate[9] | 0.91 |
| dimethylaniline[10] | 0.32 |
| Bis A-epoxy[11] | 0.61 |
| Ethylene glycol | 0.20 |
| acetone | 4.78 |

TABLE I-continued

| Compound Description | % by weight |
| --- | --- |
| hollow glass spheres[12] | 7.34 |

[1] 32-374 from Reichold Chemicals, Inc.
[2] 92-955 from Reichold Chemicals, Inc.
[3] MPA-60-x from Rheox, Inc.
[4] Advitrol 6-8 from United Catalysts, Inc.
[5] Tiona RCL-9 from SCM Chemicals
[6] MP25-38 from Pfizer
[7] Camel Wite from Genstar
[8] Aerosil 200 from DeGussa Company
[9] Ten-Cem from Mooney Chemical, Inc.
[10] N,N DMA from DuPont
[11] 37-140 from Reichold Chemicals, Inc.
[12] E-22-X Bubbles from 3M Company The filler composition was prepared by mixing all of the above-listed components. The resulting filler/glazing component was a thixotropic free flowing liquid having a viscosity approximately 1500-2500 cps (LVT #3 at 30 RPM). Its wt/gal was approximately 7.8-8.2 lbs/gallon, its volatile content (VOC) was 0.62/lb/gal or 74.5 g/l, and its pot life infinite.

A methyl ethyl ketone peroxide catalyst component at 3% by weight of the filler/glazing component was then added to the filler/glazing component to form a sprayable filler composition and sprayed onto a substrate using external mix Gelcoat spray equipment from Binks of Franklin Park, Ill. After spraying, the gel time was measured at about 1.5-2.5 minutes. The coating was tack free in 8-10 minutes at 73° F. It had an average dry coat thickness of 15-25 mils (20 avg), a sand time of 30-45 minutes at 73° F., greater than 500 hours of 5% salt fog corrosion resistance, greater than 300 hours of 100% humidity corrosion resistance. The coating may be primed and/or top coated (painted).

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A sprayable, high solids, low-volatiles filler composition for use as a coating on substrate comprising:

a) a filler/glazing component comprising a mixture of from about 20% to about 50% by weight of an unsaturated polyester resin, from about 5% to about 25% by weight of a sprayable filler selected from the group consisting of calcium talc, and combinations thereof, from about 1% to about 15% by weight of a mixture of thixotropic clays, from about 0.2% to about 2% by weight activated fumed silica, from about 1% to about 15% by weight hollow glass microspheres, from about 0% to about 20% by weight of a ketone solvent, and b) a catalyst component, whereby the sprayable, high solids, low-volatiles filler composition is able to form relatively thick single layer wet coats of from 15-25 mils, is able to fill major pits, grind marks, casting flaws and even larger surface imperfections permitting use on rough-finish, less costly substrates, and has a self-leveling ability, and whereupon after spraying and curing said upon a substrate, the composition provides corrosion resistance and a sandable surface upon said substrate.

2. The sprayable filler composition of claim 1 wherein said catalyst component is selected from the group consisting of methyl ethyl ketone peroxide and benzoyl peroxide.

3. The sprayable filler composition of claim 1 wherein said catalyst component is a separate component which may be blended with said filler/glazing component during spraying either internally or externally of the spray nozzle.

4. The sprayable filler composition of claim 1 wherein said filler/glazing component includes a coloring agent selected from the group consisting of titanium dioxide, black iron oxide, and mixtures thereof.

5. The sprayable filler composition of claim 1 wherein said filler/glazing component further includes an accelerator selected from the group consisting of dimethyl aniline, cobalt naphthenate, cobalt neodecanate, and mixtures thereof.

* * * * *

UNITED STATES PATENT AND TRADEMARK OFFICE
CERTIFICATE OF CORRECTION

PATENT NO. : 5,373,036
DATED : December 13, 1994
INVENTOR(S) : David Michael Parish and Kenneth Earl Lewis It is certified that error appears in the above-indentified patent and that said Letters Patent is hereby corrected as shown below:

Col. 8, Line 6, "of calcium talc" should be
--of calcium carbonate, talc--.

Signed and Sealed this

Twenty-eight Day of February, 1995

Attest:

BRUCE LEHMAN

Attesting Officer

Commissioner of Patents and Trademarks